United States Patent Office
3,120,510
Patented Feb. 4, 1964

3,120,510
REACTION OF AMINOPOLYALCOHOLS WITH PHOSGENE AND PRODUCTS RESULTING THEREFROM
Paul Richard Steyermark, Silver Spring, Md., assignor to W. R. Grace & Co., New York, N.Y., a corporation of Delaware
No Drawing. Filed July 26, 1961, Ser. No. 126,875
6 Claims. (Cl. 260—211.5)

The present invention relates to the preparation of novel 2-oxazolidones. More specifically the present invention relates to 2-oxazolidone compounds prepared from amino substituted aldoses and alditols, and to a novel method for their preparation.

It is generally known that lower monohydroxy alcohols react with phosgene to produce the 2-oxazolidone heterocycle. A typical example of such a reaction is the reaction of B-amino-ethanol with phosgene in the presence of inert hydrocarbon solvent to produce 2-oxazolidone.

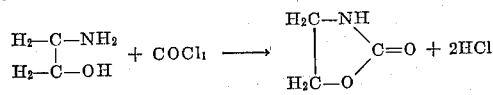

While the phosgene-B-amino alcohol route provides a simple and convenient approach for obtaining 2-oxazolidones from monohydroxy B-amino alcohols which are soluble in inert solvents, it has generally been thought that due to the fact phosgene hydrolyzes in the presence of water phosgene would be unsuitable for preparing 2-oxazolidones from polyhydroxy amino-alcohols which are primarily only water soluble. Therefore up to the present time phosgene has not been used to prepare 2-oxazolidones from water soluble amino sugars. Furthermore, attempts to produce 2-oxazolidones from simple sugars by numerous other methods have generally been unsuccessful.

It is therefore an object of the present invention to provide 2-oxazolidone derivatives of simple amino sugars.

It is a further object of the invention to provide a convenient and simple method by which 2-oxazolidones may be prepared by the reaction of phosgene and amino substituted aldoses and alditols.

These and still further objects of the present invention will become mentally apparent to one skilled in the art from the following detailed description and specific examples.

In general the present invention contemplates the preparation of novel 2-oxazolidone derivatives of simple amino sugars by the reaction of phosgene with amino substituted aldoses and alditols in basic aqueous solution.

Most specifically the invention involves 2-oxazolidones having the general formulae:

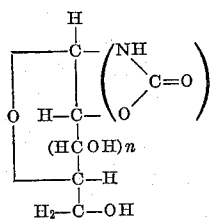

and

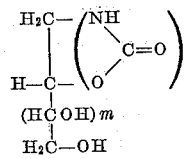

where $n$ has a value of 1 or 2 and $m$ has a value of 0, 1, 2, or 3. In the event the amino group is substituted on the second carbon atom, the isomers

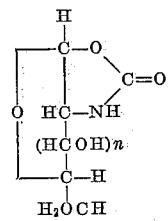

and

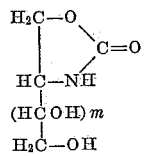

will occur. For this reason the

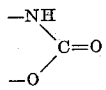

group is placed in brackets in the above formulae to indicate that both isomers are intended.

The present novel 2-oxazolidone derivatives are prepared by dissolving the appropriate deoxyamino aldose or alditol in an aqueous solution of a proton acceptor, and slowly adding phosgene while the reaction mixture is simultaneously agitated and preferably cooled. As mentioned previously this novel synthesis approach yields an unexpected result in that phosgene when added to a basic aqueous media would be expected to hydrolyze. Hydrolysis, however, occurs only to a very limited extent and the phosgene preferably reacts substantially immediately with the amino substituted aldose or alditol to yield the desired 2-oxazolidone derivatives. The reaction may be illustrated as follows:

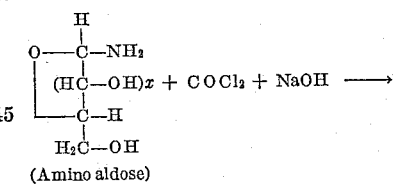
(Amino aldose)

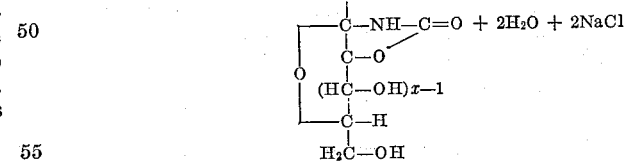

and,

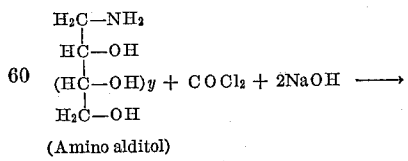
(Amino alditol)

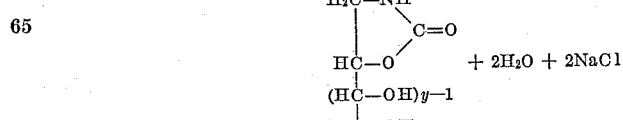

wherein $x$ has a value of 2 or 3 and $y$ has a value of 1, 2, 3 or 4.

The purpose of the proton acceptor is to neutralize or absorb the hydrochloric acid which is liberated during the above illustrated reaction. Suitable proton acceptors are water soluble inorganic and organic bases such as sodium carbonate, sodium hydroxide, and tertiary amines. A slightly different type of proton acceptor which is entirely suitable for the practice of the present invention is a water suspendable basic type ion exchange resin. The amount of proton acceptor used in the present process is the amount equal to or slightly excess of that required to neutralize or absorb the hydrochloric acid produced during the reaction. In theory this amount would at least equal to two equivalents of base per mole of phosgene utilized in the reaction.

The temperatures at which their action may be conducted range from about $-10°$ C. to about 50° C. with temperatures ranging from $-5°$ to 10° being generally preferred. The amount of phosgene added during the reaction for optimum yield is usually at least 125% of the theoretical amount required to react with the amino sugar present, however less may be used with decreased yields resulting. The phosgene reacts with the amino aldoses and alditols substantially spontaneously upon contact, hence the reaction generally requires very little time to reach completion. However to insure complete reaction the reaction mixture is generally maintained at the above mentioned temperature for 1 to 2 hours.

The deoxyamino aldoses and alditols used in the practice of the present invention are well known to those skilled in the art, and several methods for their preparation have been reported in the literature. For example, the deoxyamino aldose, glucopyranosylamine, has been reported by C. A. Lobry De Bruyn and A. P. N. Franchimont, in Rec. 12,286 (1893): and the deoxyamino alditol, glucamine, was reported by O. Piloty and O. Ruff, in Ber. 30, 1656 (1897).

Having described the essential aspects of the present invention the following specific examples are given to illustrate the practice thereof:

*Example I*

Six grams (0.061 mole) of phosgene was slowly introduced into a solution of 12 grams (0.067 mole) of beta-glucopyranosylamine dissolved in 80 milliliters of 1 molar sodium carbonate. The reaction mixture was maintained at temperatures between $-5$ and 0° C. and constantly agitated for 2 hours. Subsequently, it was maintained at a temperature of 5° C. for 18 hours. A solid material (3.3 grams) was recovered by filtration. This product possessed a melting point of 220 to 225° C. (dec.) and a refractive index $[\alpha]_D^{25}=52.4°$. The crude product was subsequently recrystallized from 50 ml. of 70% aqueous methanol (and a solid having a melting point of 220–222° C. (dec., gas evolved) and $[\alpha]_D^{25}=56.0°$). Titration of the product revealed the absence of any free amino groups. The product possesses the following structural formula:

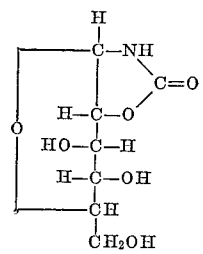

and analysis indicates the following—Calculated for $CrH_{11}NO_6$: C, 40.99; H, 5.41; N, 6.83. Found: C, 41.16; H, 5.11; N, 6.72. Furthermore the tetraacetyl derivatives was prepared and found to possess a melting point of 150–151° C.

*Example II*

Twenty-two grams (0.222 mole) of phosgene was introduced during a 2½ hour period into a solution of 60 grams (0.332 mole) of glucamine in 250 ml. of 1 molar aqueous sodium carbonate. The temperatures maintained at between $-5°$ and 5° C. The solution was agitated for an additional 2 hours then neutralized with acetic acid. The reaction mixture was then evaporated at reduced pressure and the residue was taken up in boiling methanol. A precipitate which consisted of sodium chloride was filtered off. An aliquot of the solution was found to be neutral which indicated the absence of free amino groups. On evaporation of solution to dryness an oily yellow material which was somewhat soluble in alcohol and insoluble in acetone was obtained. Eventually crystallization of the material gave a yield of 13 grams of crystals which possessed a melting point of 155–156° C. and an index of refraction of $[\alpha]_D^{25}=47.6$. Analysis of the product indicate the following—Calculated for $CrH_{13}NO_6$: C, 40.58; H, 6.33; N, 6.76. Found: C, 40.01; H, 6.32; N, 6.79. The tetraacetyl derivative melts at 126–127° C.

The compound possesses the formula:

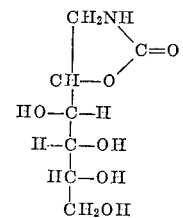

*Example III*

The procedure of Example I was repeated except the mole ratio of phosgene of glycopyranosylamine (GPA), the proton acceptor, and reaction temperature were varied. The results of various runs are tabulated below:

| Run | Moles $CoCl_2$/ Moles GPA | Proton Acceptor | Temp., °C | Yield, percent |
|---|---|---|---|---|
| 1 | 0.91 | 10% of $Na_2O_3$ | −5 to 0 | 24 |
| 2 | 0.87 | 1N NaOH | 5 to 10 | 5.7 |
| 3 | 1.23 | 25% of $Et_3N$ | 20 to 25 | 10 |
| 4 | 1.65 | Sat'd $NaHCO_3$ | 0 to 5 | 30 |
| 5 | 1.01 | Pyridine | 0 to 3 | 6.4 |
| 6 | 3.03 | Sat'd $NaHCO_3$ | room | 12 |
| 7 | 1 | 25% of $Et_3N$ | 0 to 3 | 20.8 |

The present 2-oxazolidones when esterified with at least 1 mole of a long chain fatty acid per mole yield compounds having surface active characteristics.

I claim:
1. Compounds selected from the group consisting of:

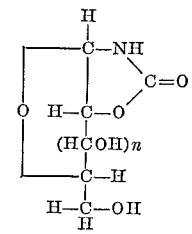

and

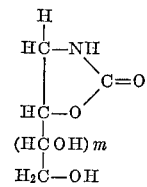

wherein $n$ is an integer of from 1 to 2 and $m$ is an integer of from 1 to 3.

2. The compound

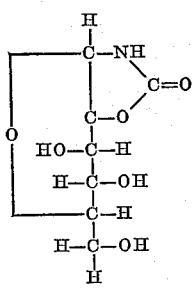

3. The compound

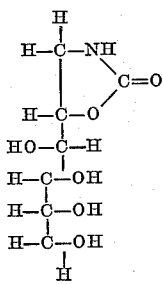

4. A method for preparing 2-oxazolidones which comprises reacting an aqueous basic solution of a member selected from the group consisting of

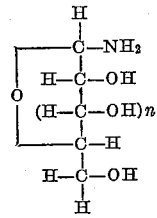

and

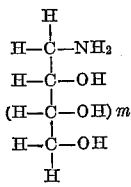

wherein $n$ is an integer of from 1 to 2 and $m$ is an integer of from 1 to 3 with phosgene, and recovering the resultant 2-oxazolidone from the solution.

5. The method of claim 4 wherein the aquous solution is rendered basic by the addition of a proton acceptor selected from the group consisting of inorganic bases, tertiary amines, and basic ion exchange resins.

6. The method of claim 4 wherein the solution is maintained at a temperature at from about −10 to about 50° during the addition of phosgene.

References Cited in the file of this patent

UNITED STATES PATENTS 2,437,390    Homeyer _____ Mar. 9, 1948

OTHER REFERENCES

Fuchs: Berichte der Deutschen Chemischen Gesellschaft, 55, page 2943 (October 1922).

Mousseron et al.: Academie des Sciences Comptes Rendus, 235, pages 373–375 (1952).

UNITED STATES PATENT OFFICE
CERTIFICATE OF CORRECTION

Patent No. 3,120,510                      February 4, 1964

Paul Richard Steyermark

It is hereby certified that error appears in the above numbered patent requiring correction and that the said Letters Patent should read as corrected below.

Column 3, line 51, for "refractive index" read -- specific optical rotation --; line 70, for "$CrH_{11}NO_6$" read -- $C_7H_{11}NO_6$ --; column 4, line 16, for "an index of refraction" read -- a specific optical rotation --; line 18, for "$CrH_{13}NO_6$" read -- $C_7H_{13}NO_6$ --; same column 4, in the table, third column, line 1 thereof, for "$Na_2O_3$" read -- $Na_2CO_3$ --; same table, third column, line 2 thereof, for "IN NaOH" read -- 1N NaOH --.

Signed and sealed this 6th day of July 1965.

(SEAL)
Attest:

ERNEST W. SWIDER                      EDWARD J. BRENNER
Attesting Officer                   Commissioner of Patents